United States Patent
Li et al.

(10) Patent No.: US 11,785,629 B2
(45) Date of Patent: *Oct. 10, 2023

(54) METHOD AND APPARATUS FOR TRANSMITTING AND RECEIVING DATA

(71) Applicant: Telefonaktiebolaget LM Ericsson (publ), Stockholm (SE)

(72) Inventors: Gen Li, Beijing (CN); Junaid Ansari, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

This patent is subject to a terminal disclaimer.

(21) Appl. No.: 17/210,055

(22) Filed: Mar. 23, 2021

(65) Prior Publication Data

US 2021/0212077 A1 Jul. 8, 2021

Related U.S. Application Data

(63) Continuation of application No. 16/488,192, filed as application No. PCT/CN2017/083614 on May 9, 2017, now Pat. No. 10,966,212.

(51) Int. Cl.
*H04W 72/541* (2023.01)
*H04W 72/02* (2009.01)
(Continued)

(52) U.S. Cl.
CPC ......... *H04W 72/541* (2023.01); *H04W 72/02* (2013.01); *H04W 72/044* (2013.01); *H04W 72/51* (2023.01)

(58) Field of Classification Search
None
See application file for complete search history.

(56) References Cited

U.S. PATENT DOCUMENTS 9,609,527 B1 * 3/2017 Tailor .................... H04W 16/28
9,660,735 B1 * 5/2017 Liu ....................... H04W 72/541
(Continued)

FOREIGN PATENT DOCUMENTS

CN 1371221 A 9/2002
CN 1784840 A 6/2006
(Continued)

OTHER PUBLICATIONS

First Office Action for Chinese Patent Application No. 2017800905922, dated Feb. 24, 2022, 14 pages.
(Continued)

*Primary Examiner* — Ernest G Tacsik
(74) *Attorney, Agent, or Firm* — Withrow & Terranova, PLLC

(57) ABSTRACT

The present disclosure presents a method for a first receiver in a first communication link, the first communication link sharing a communication channel with a second communication link in a wireless network, the first communication link corresponding to a first set of beam directions, the second communication link corresponding to a second set of beam directions, and the method comprises determining whether a communication quality satisfies a predefined criterion; and selecting a first beam direction from the first set of beam directions in response to determining the communication quality satisfying the predefined criterion. The present disclosure also presents a further method for a second transmitter and the further method comprising receiving a beam direction selection signaling and selecting a second beam direction from the second set of beam directions in the second communication link. The first receiver and the second transmitter in respective communication links are also disclosed.

20 Claims, 5 Drawing Sheets

(51) Int. Cl.
*H04W 72/044* (2023.01)
*H04W 72/51* (2023.01)

(56) References Cited

U.S. PATENT DOCUMENTS

| | | | | |
|---|---|---|---|---|
| 2005/0181833 | A1* | 8/2005 | Lee | H01Q 3/26 455/562.1 |
| 2007/0175995 | A1* | 8/2007 | Maniwa | H04B 5/0062 235/451 |
| 2010/0151792 | A1* | 6/2010 | Ishioka | H04B 7/0617 455/63.4 |
| 2012/0099474 | A1* | 4/2012 | Gauthier | H04B 7/0808 370/252 |
| 2014/0378054 | A1* | 12/2014 | Wang | H04B 15/00 455/41.2 |
| 2015/0282122 | A1* | 10/2015 | Kim | H04L 25/03898 370/329 |
| 2016/0087349 | A1* | 3/2016 | Lee | H01Q 21/061 342/373 |
| 2016/0352625 | A1* | 12/2016 | Kim | H04L 1/188 |
| 2016/0353467 | A1 | 12/2016 | Nekovee | |
| 2017/0033916 | A1 | 2/2017 | Stirling-Gallacher et al. | |
| 2017/0303265 | A1* | 10/2017 | Islam | H04B 7/0695 |

FOREIGN PATENT DOCUMENTS

| | | |
|---|---|---|
| CN | 101594620 A | 12/2009 |
| CN | 101998424 A | 3/2011 |
| CN | 102404097 A | 4/2012 |
| CN | 105451255 A | 3/2016 |
| CN | 105874838 A | 8/2016 |
| WO | 2010088662 A2 | 8/2010 |
| WO | 2016006964 A1 | 1/2016 |
| WO | 2016197315 A1 | 12/2016 |
| WO | 2017020243 A1 | 2/2017 |

OTHER PUBLICATIONS

Examination Report for European Patent Application No. 17909047. 7, dated Mar. 11, 2022, 5 pages.
Examination Report for Indian Patent Application No. 201947044556, dated Jul. 22, 2021, 6 pages.
Non-Final Office Action for U.S. Appl. No. 16/488,192, dated Jan. 16, 2020, 37 pages.
Final Office Action for U.S. Appl. No. 16/488,192, dated Jul. 9, 2020, 48 pages.
Notice of Allowance and Examiner-Initiated Interview Summary for U.S. Appl. No. 16/488,192, dated Dec. 1, 2020, 14 pages.
International Search Report and Written Opinion for International Patent Application No. PCT/CN2017/083614, dated Jan. 25, 2018, 11 pages.
Extended European Search Report for European Patent Application No. 17909047.7, dated Aug. 20, 2020, 9 pages.
Second Office Action for Chinese Patent Application No. 201780090592. 2, dated Apr. 19, 2022, 28 pages.
Third Office Action for Chinese Patent Application No. 201780090592. 2, dated Jun. 21, 2022, 9 pages.

* cited by examiner

METHOD AND APPARATUS FOR TRANSMITTING AND RECEIVING DATA

This application is a continuation of U.S. application Ser. No. 16/488,192, filed Aug. 22, 2019, now U.S. Pat. No. 10,966,212, which is a 35 U.S.C. § 371 national phase filing of International Application No. PCT/CN2017/083614, filed May 9, 2017, the disclosures of which are incorporated herein by reference in their entireties.

TECHNICAL FIELD

The present disclosure is generally directed to methods for transmitting and receiving data in a first communication link and a second communication link in a shared band in a wireless network and transmitter and receiver apparatuses thereof.

BACKGROUND

In order to meet an increasing demand for higher overall network capability and higher end-user data rate, the next generation of wireless communication system, such as the fifth generation (5G) communication system, is expected to be operating in unlicensed shared bands, especially for enterprise solutions. Thus coexistence support of two or more communication links is needed for the contention based access in order to enable spectrum sharing between different operators or other communication systems.

Listen-before-talk (LBT) mechanism is a flexible way to achieve this coexistence support between different communication systems in unlicensed shared band, in which a communication node intending to transmit data first performs a channel sensing, such as in a clear channel assessment (CCA) procedure, and checks whether the channel is available or not. The communication node will transmit data when it determines that the shared channel is available, otherwise the communication node will defer its transmission for a certain period until the channel is deemed to be free. LBT relies on listening at transmitter side to determine if there will be interference at the receiver side and thus there may be a large difference between sensed power at the transmitter side and the actual interference power at the receiver side especially in high gain beamforming scenarios, which may result in severe problems. For example, the transmitter may be unable to listen to the potential interferer resulting into packet collision, i.e., interference at the receiver side.

For communication throughput, the different communication links share the unlicensed band in a time division way, which means the throughput of each communication link is severely degraded compared to with a traditional isolation deployment. Moreover, there may be some low interference application scenarios, and thus, the channel sensing procedure performed in a transmitting node before the actual data transmission may waste transmission resource, leading to lower spectrum efficiency.

SUMMARY

It is an object of the present disclosure to resolve or alleviate at least one of the problems mentioned above. It is assumed that there are at least two communication links sharing an unlicensed band in a wireless network. A transmitter in a communication link will transmit its data without performing a channel sensing procedure first, and the receiver will try to solve the potential interference from another communication link through a beam direction switching procedure, thereby improving the overall spectrum efficiency for the wireless network. For simplicity, those two links sharing the unlicensed band are described thereinafter.

According to one aspect of the disclosure, there is provided a method for a first receiver receiving data from a first transmitter in a first communication link, the first communication link sharing a communication channel with a second communication link between a second transmitter and a second receiver in a wireless network, the first communication link corresponding to a first set of beam directions, the method comprises a step of receiving data from the first transmitter in a first active beam direction in the first communication link, in presence of interference from the second communication link, a step of determining whether a communication quality satisfies a predefined criterion, and a step of selecting a first beam direction from the first set of beam directions in response to determining the communication quality satisfying the predefined criterion.

According to a further aspect of the disclosure, there is provided a further method for the first receiver in the first communication link, in which the step of determining whether a communication quality satisfies a predefined criterion comprises a step of decoding the data received from the first transmitter in the first communication link; and a step of determining whether the data is successfully decoded, and the step of selecting a first beam direction from the first set of beam directions comprises a step of selecting a first beam direction from the first set of beam directions in response to determining the data is not successfully decoded.

According to a further aspect of the disclosure, there is provided a further method for the first receiver in the first communication link, in which the step of determining whether a communication quality satisfies a predefined criterion comprises a step of measuring an interference from the second communication link in the first active beam direction, and a step of determining whether the interference is higher than a predefined active-beam interference level, and the step of selecting a first beam direction from the first set of beam directions comprises a step of electing a first beam direction from the first set of beam directions in response to determining the interference level being higher than the predefined active-beam interference level.

According to a further aspect of the disclosure, there is provided a further method for the first receiver in the first communication link, in which the step of selecting a first beam direction from the first set of beam directions comprises a step of measuring an interference from the second communication link in each of the first set of beam directions, and a step of selecting a first beam direction with an interference measurement value being lower than an interference threshold.

According to a further aspect of the disclosure, there is provided a further method for the first receiver in the first communication link, in which the second communication link corresponding to a second set of beam directions and the method further comprises a step of informing the first transmitter to continue transmitting data in the first active beam direction in the first communication link, in response to the selected first beam direction being the first active beam direction.

According to a further aspect of the disclosure, there is provided a further method for the first receiver in the first communication link, in which the second communication link corresponding to a second set of beam directions and the method further comprises a step of sending a beam direction selection signaling to the second transmitter of the second communication link in response to the selected first beam direction being the first active beam direction, and the signaling indicating the second transmitter to select a second beam direction from the second set of beam direction in the second communication link.

According to another aspect of the disclosure, there is provided a method for a second transmitter transmitting data to a second receiver in a second communication link, the second communication link sharing a communication channel with a first communication link between a first transmitter and a first receiver in a wireless network, the second communication link corresponding to a second set of beam directions, the method comprises a step of receiving a beam direction selection signaling from the first receiver, wherein the signaling indicating the second transmitter to select a second beam direction from the second set of beam direction, and a step of selecting a second beam direction other than the second active beam direction from the second set of beam directions in the second communication link.

According to a further aspect of the disclosure, there is provided a further method for the second transmitter in the second communication link, in which the step of selecting the second beam direction from the second set of beam directions comprises a step of selecting the second beam direction based on a space departure of each of second set of beam directions with respect to the second active beam direction.

According to a further aspect of the disclosure, there is provided a further method for the second transmitter in the second communication link, in which the step of selecting the second beam direction from the second set of beam directions further comprises a step of selecting the second beam direction based on a geometric position of the first receiver, wherein the geometric position of the first receiver is conveyed in the beam direction selection signaling.

According to a further aspect of the disclosure, there is provided a further method for the second transmitter in the second communication link, in which the step of selecting the second beam direction from the second set of beam directions further comprises a step of selecting the second beam direction based on a mapping between each of the second set of beam directions and an interference level.

According to a further aspect of the disclosure, there is provided a further method for the second transmitter in the second communication link, in which the method further comprises a step of informing the second receiver with the selected second beam direction and a step of transmitting data to the second receiver in the selected second beam direction in the second communication link.

According to a further aspect of the disclosure, there is provided a further method for the second transmitter in the second communication link, in which the method further comprises a step of in response to receiving the beam direction selection signaling from the first receiver for a preset number of times, suspending transmitting data to the second receiver in the second communication link for a preset period.

BRIEF DESCRIPTION OF THE DRAWINGS

Exemplary features of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF EMBODIMENTS

Figure 1:
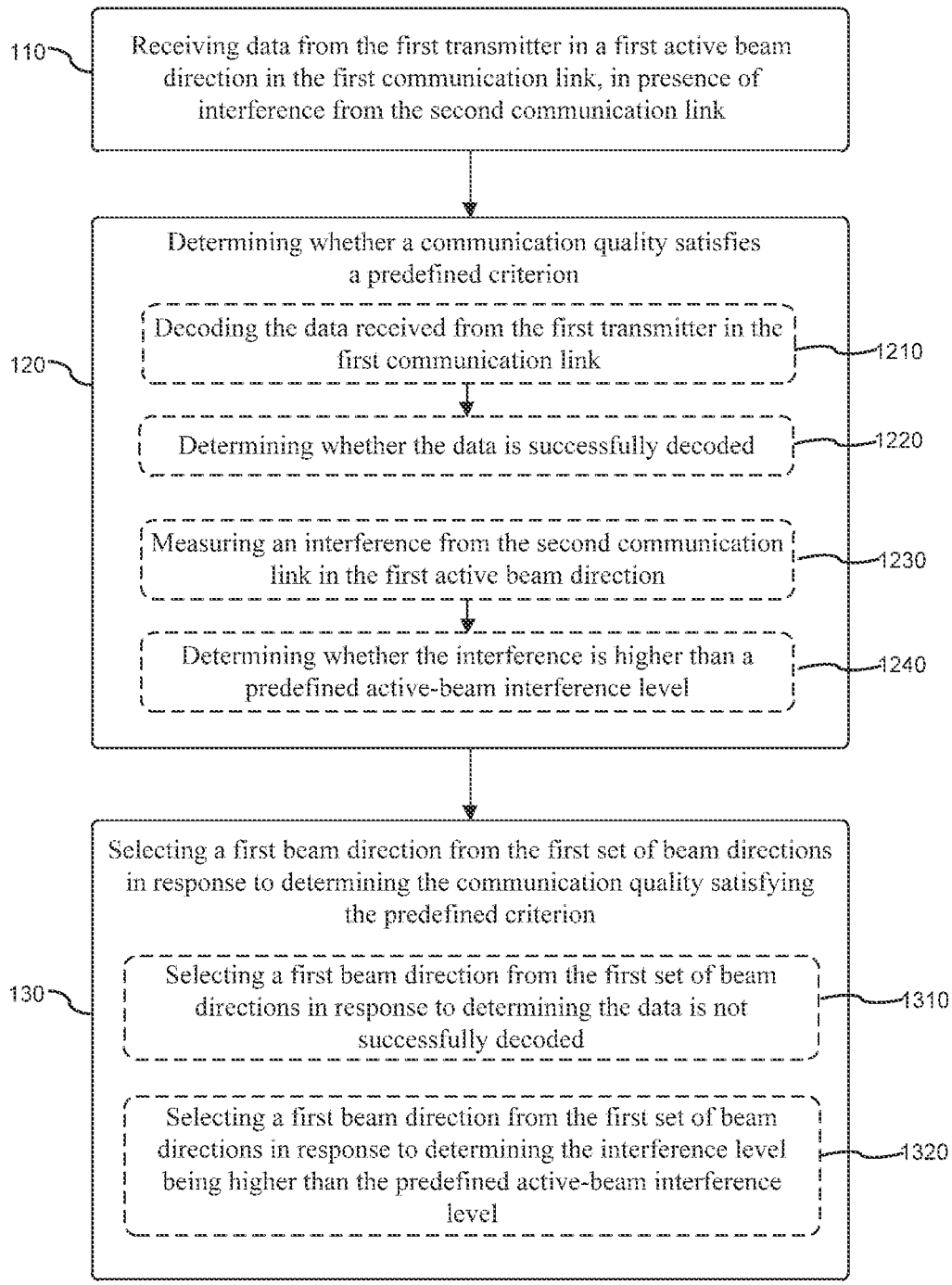
FIG. 1 illustrates an exemplary flow diagram for a method in a first receiver in a first communication link in a wireless network according to one or more embodiments of the invention.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present disclosure is described below with reference to block diagrams and/or flowchart illustrations of methods, nodes, devices and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

FIG. 1 illustrates an exemplary flow diagram for a method in a first receiver in a first communication link in a wireless network according to one or more embodiments of the invention. It is assumed there are two communication links operating in a shared band in a wireless network. The transmitters and receivers at respective communication links are equipped with multiple antennas to exploit a spatial reuse via various beamforming techniques. The first transmitter intends to transmit data to the first receiver in the first communication link, and at the same time the second transmitter may be transmitting data to the second receiver in the second communication link. The first transmitter will not first perform a channel listening before its transmission to the first receiver such as in the LBT mechanism; instead the first transmitter may transmit its data even though in presence of interference from the second communication link and the first receiver will solve the potential interference through a beam direction selection procedure, leading to higher spectrum efficiency compared with the legacy LBT protocols. In the present disclosure, the first transmitter first transmits the data and then the first receiver will sense the interference and try to solve the interference by selecting and switching to another beam direction in the first communication link, and such communication protocol may be referred to as listen-after-talk (LAT).

In step 110, the first receiver receives data from the first transmitter in a first active beam direction in the first communication link, in presence of interference from the second communication link. The terms of beam direction and active beam direction will be explained in details as follows. As the first transmitter will not first perform a channel sensing and the second transmitter of the second communication link may be transmitting in the shared channel, thus the first receiver may receive the data in the first communication link in the shared band in presence of the interference from the second communication link in the wireless network.

A beam direction in a communication link could be represented by a precoding vector or matrix at a transmitter side and/or a post processing vector or matrix at a receiver side, which depend on the specific beamforming techniques employed for certain application scenarios. An active beam direction refers to the beam direction which is utilized for the current transmission in a communication link. It is assumed that a set of beam directions is available and maintained by the communication link. For example, in FIG. 2, there are three beam directions in a communication link between a transmitter and a receiver, which are equipped with multiple antennas respectively. It should be mentioned that the transmitter is illustrated as a base station and the receiver is illustrated as a mobile user, however, FIG. 2 only serves as a non-limiting example of downlink transmission and the method described in the present disclosure can be also applied to the uplink transmission scenarios. This multiple beam configuration is highly likely for indoor scenarios and urban deployments due to fruitful reflections. The beam direction information should be trained at an initial connection establishment process between the transmitter and receiver and then it is stored in both the transmitter and receiver. Furthermore, such beam direction may be renewed periodically or the beam direction renewal may be triggered by specific predefined events to guarantee updated information. The beam direction information updating process could be based on the measurement of certain reference signals, e.g., mobility reference signals (MRS) in 5G communication systems, so that the robustness could be achieved even in high mobility application scenario for example. The active beam direction may be switched to another beam direction for a further transmission, which may be referred to as a new active beam direction for the further transmission. It should be also noted that the method in the present disclosure is not limited to scenarios with only one active beam direction in a communication link for data transmission, and one active beam direction is described in the following description only for exemplary illustration. The person skilled in art may appreciate the cases in which multiple active beam directions are used simultaneously for one transmission, without departing the spirit and teaching of this disclosure.

In step 120, the first receiver determines whether a communication quality satisfies a predefined criterion. Interference from the second communication link may exist, and therefore the communication quality in the active beam direction in the first communication link may be degraded due to the presence of interference from the second communication link. The communication quality in the first communication link is evaluated to determine whether the beam direction switching in the first communication link should be performed or not. It may be desirable to exploit different forms of communication quality, which depends on the specific system implementations.

In one embodiment of the present invention, the communication quality could be measured by the decoding result in the first receiver. For example, in sub step 1210, the first receiver may decode the data received from the first transmitter in the first communication link; and in sub step 1220, the first receiver determines whether the data is successfully decoded, for example, via a Cyclic Redundancy Check (CRC). In this embodiment, an event that communication quality satisfying a predefined criterion refers to that the first receiver determines that the data is not successfully decoded due to the interference from the second communication link.

In another embodiment of the present invention, the communication quality may be measured by an interference measurement in the first active beam direction. For example, in sub step 1230, the first receiver may measure an interference from the second communication link in the active beam direction to determine the communication quality. For example, the first receiver may have the knowledge of certain reference signals from the second transmitter, based on which the first receiver may measure the interference from the second communication link. For another example, in certain application scenarios, where the only interference source at the first receiver is the second communication link, the first receiver may obtain the interference measurement from the second communication link according to a total signal power and a useful signal power measured respectively. For still another example, the first receiver may simply take the total interference received at the first receiver, as the interference from the second communication link. In sub step 1240, the first receiver determines whether the interference is higher than a predefined active-beam interference level. In this embodiment, an event that the communication quality satisfying a predefined criterion refers to that the first receiver determines that the interference from the second communication link in the active beam direction is higher than a predefined active-beam interference level. In such cases, the first receiver may select another beam direction in order to alleviate or mitigate the interference from the second communication link, instead of simply deferring its transmission due to the interference. It should be appreciated for those skilled in the art that the communication quality and its corresponding predefined criterion could also be a combination of the decoding result, e.g., success or not and the interference measurement in the active beam direction. Any modification, variation and change for the specific implementations of the communication quality may be appreciated by the skilled in the art and thus should fall within the teaching and the scope of the present disclosure.

In step 130, the first receiver selects a first beam direction from the first set of beam directions in response to determining the communication quality satisfying the predefined criterion. As discussed above, for one embodiment of the invention, in sub step 1310, the first receiver selects a first beam direction from the first set of beam directions in response to determining the data is not successfully decoded. For another embodiment of the invention, the first receiver in sub step 1320, selects a first beam direction from the first set of beam directions in response to determining the interference level being higher than the predefined active-beam interference level. It should be also mentioned that the first receiver may select more than one first beam directions for data transmission in a parallel transmission fashion. It is desirable for those skilled in the art to appreciate and conceive modification, or change to the present disclosure in different system configurations or application scenario, with the teaching and suggestion in this disclosure.

In a further embodiment of the present invention, if there is a first beam direction other than the first active beam direction having been selected in the first communication link, the first receiver may inform the first transmitter with the selected first beam direction. The information could be integrated with the negative acknowledgment (NACK) transmission or transmitted as a separate Radio Resource Control (RRC) or a Media Access Control (MAC) signaling (e.g., MAC control element (CE) signaling). Preferably, it could also include the time/frequency position that the transmitter should start the data transmission. Therefore, for the next transmission, the active beam direction should be the selected beam direction, and the first receiver may receive data from the first transmitter in the selected first beam direction in the first communication link. Alternatively or additionally, in response to a first beam direction in the first communication link is selected, the first receiver may send a signaling to the second transmitter of the second communication link, and the signaling indicates that the second transmitter is not required to suspend transmitting to the second receiver in the second communication link in order to eliminate or mitigate its interference to the first link. Compared with the legacy LAT mechanism, where the interfered first transmitter may simply send the second transmitter a singling to suspend the transmission in the second communication link, the spectrum efficiency of the LAT systems in the embodiments of the present invention is higher due to utilization of the spatial freedom in a communication channel. For example, the signaling may indicate that the second transmitter is not required to select another second beam direction in the second communication link. For another example, the signaling may indicate that the second transmitter to continue transmitting (if any data to be transmitted in the second communication link) in its current active beam direction. Alternatively or additionally, information field of the signaling may be null, which implicitly indicates that the second transmitter is not required to suspend its transmission or the second transmitter is not required to select a new second beam direction or the second transmitter continues to use its current active beam direction for further transmission (if any).

In a still further embodiment of the present invention, if the first active beam direction is selected in the first communication, the first receiver may inform the first transmitter to continue transmitting data in the first active beam direction for the next transmission in the first communication link. Alternatively or additionally, the first receiver may send a beam direction selection signaling to the second transmitter of the second communication link, and the beam direction selection signaling indicates that the second transmitter to select a second beam direction from the second set of beam directions in the second communication link. In such cases, as no new first beam direction is successfully selected, the first receiver is not capable of solving the interference through its own first beam direction switching as discussed above, therefore, the first receiver may send the beam direction selection signaling to the second transmitter in the second communication link, indicating the second interfering transmitter to perform a second beam direction selection so as to lower the interference from the second transmitter to the first receiver. It is desirable that the beam direction selection signaling may include useful information to help the second communication link select a correct second beam direction with acceptable interference or without any interference, and such useful information may be a position of the first receiver, for example.

In the present disclosure, the receiver may be a communication device also known as mobile terminal, wireless terminal and/or User Equipment (UE), which is enabled to communicate wirelessly with a transmitter in a wireless communication network, sometimes also referred to as a cellular radio system. For instance, a communication device may be, but is not limited to, mobile phone, smart phone, sensor device, meter, vehicle, household appliance, medical appliance, media player, camera, or any type of consumer electronic, for instance, but not limited to, television, radio, lighting arrangement, tablet computer, laptop, or Personal Computer (PC). The communication device may be a portable, pocket-storable, hand-held, computer-comprised, or vehicle-mounted mobile device, enabled to communicate voice and/or data, via a wireless or wired connection.

Typically, in the present disclosure, the transmitter may be an access node in a wireless network, which may serve or cover one or several cells of the wireless communication system. That is, the transmitter provides radio coverage in the cell(s) and communicates over an air interface with communication devices operating on radio frequencies within its range. The transmitter in some wireless communication systems may be also referred to as "eNB", "eNodeB", "NodeB", "B node" or "gNB" for example in cellular communication systems or as "access point (AP)" in Wi-Fi or WLAN systems, depending on the technology and terminology used. In the present disclosure, the transmitter may also be referred to as a Base Station (BS). The transmitter may be of different classes such as e.g. macro eNodeB, home eNodeB or pico base station, or relay node in heterogeneous or homogeneous wireless networks, based on transmission power and thereby also cell size. It can be understood that in the uplink transmission scenarios, the first receiver may be an access node, such as a BS, while the first transmitter may be a communication device, such as a UE for example, and the methods in connection with the embodiments of FIG. 1 is still applicable in such uplink scenarios.

Figure 3:
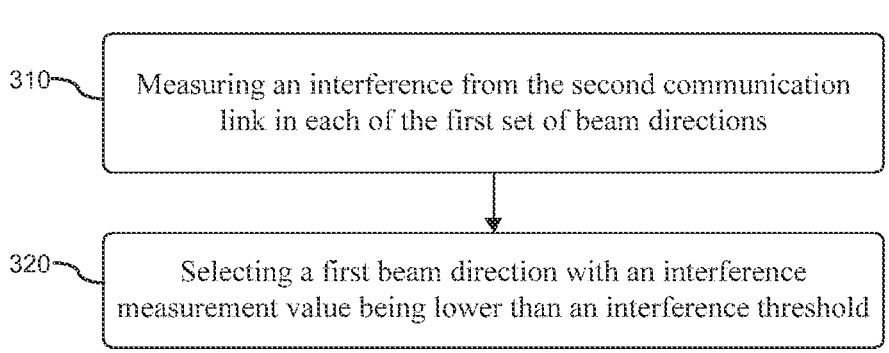
FIG. 3 is an exemplary flow diagram of a step of the method of FIG. 1 according to one or more embodiments of the invention.

FIG. 3 is an exemplary flow diagram of a step of the method of FIG. 1 according to one or more embodiments of the invention. As illustrated above, the first receiver in step 130 may select a first beam direction from the first set of beam directions in response to determining the communication quality satisfying the predefined criterion. This step may be explained in more detail with the aid of FIG. 3, which is a flow chart of a number of sub steps.

Figure 2:
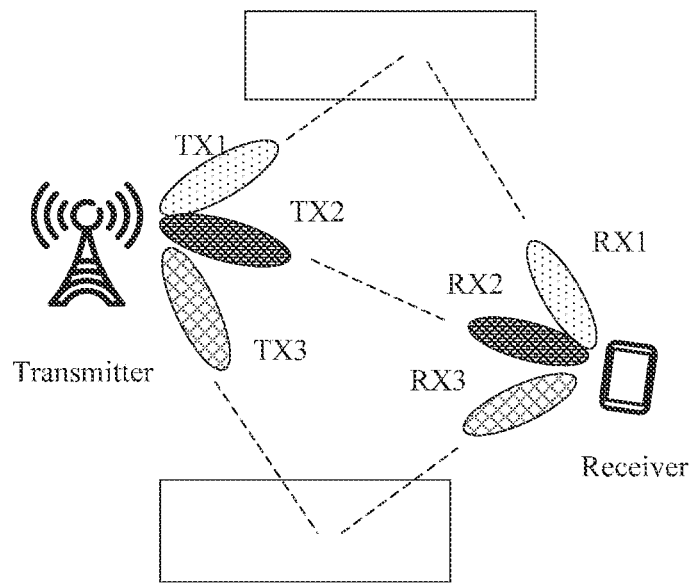
FIG. 2 shows an example for a set of beam directions in a communication link between a transmitter and a receiver according to one or more embodiments of the invention.

In sub step 310, the first receiver measures an interference from the second communication link in each of the first set of beam directions. For example, it is assumed that the active beam direction is TX 1 and RX 1 beam direction, as shown in FIG. 2. Then, the first receiver may measure the interference energy or power in RX 2 and RX 3 beam direction, respectively. If the interference measurement value in a candidate beam direction (e.g., RX 2 and RX 3) is lower than a certain interference threshold, it can be seen as no interference. The interference measurement could be based on an aggregated energy or based on certain reference signals from the second transmitter.

Alternatively, in some of the above mentioned embodiments in which the sub step 1230 is involved, the sub step 310 can be combined with the sub step 1230 into one sub step: measuring interference from the second communication link in the set of beam directions of the first communication link.

In sub step 320, the first receiver may select a first beam direction with an interference measurement value being lower than an interference threshold, or select with the lowest interference measurement value among the interference measurement values, and the selected first beam direction is used for further transmissions in the first communication link.

It should be mentioned that in most circumstances the selected first beam direction is other than the first active beam direction. There is also possibility that the interference measurement value of the first active beam direction is the lowest among the interference measurement values of each beam direction of the first set of beam direction. In this case, the first beam direction would be selected as the first active beam direction, or the beam direction with the second best interference measurement value would be selected as the first active beam direction, but either of these selection would trigger a beam direction selection signalling to the second transmitter, as illustrated in some of the above mentioned embodiments.

Figure 4:
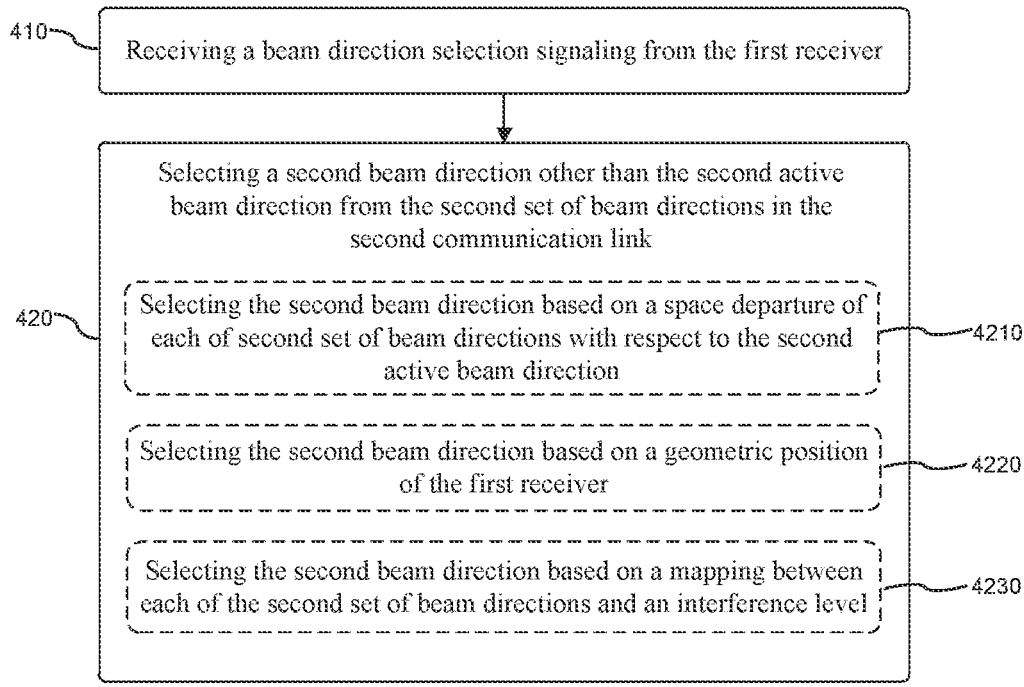
FIG. 4 illustrates an exemplary flow diagram for a method in a second transmitter in a second communication link in a wireless network according to one or more embodiments of the invention.

FIG. 4 illustrates an exemplary flow diagram for a method in a second transmitter in a second communication link in a wireless network according to one or more embodiments of the invention. As discussed above, the second communication link shares a common band in a wireless network with the first communication link between the first transmitter and the first receiver. There is a second set of beam directions in the second communication link, and the second transmitter and receiver in the second communication link is working in a second active beam direction.

In step 410, the second transmitter receives a beam direction selection signaling from the first receiver, and the beam direction selection signaling indicates the second transmitter to select a second beam direction other than the second active beam direction from the second set of beam directions. If the second transmitter receives the beam direction selection signaling, it means the first communication link, i.e., a victim link is not capable of solving the interference from the second transmitter by itself, and the first receiver of the first communication link may send this beam direction selection signaling to initiate a coordinated processing in the interfering second transmitter of the second communication link, i.e., an aggressor link.

In step 420, the second transmitter selects a second beam direction other than the second active beam direction from the second set of beam directions in the second communication link. It is desirable that the selection of the second beam direction from the second set of beam directions may be performed in different ways or a combination thereof. In one embodiment of the invention, in step 4210, the second transmitter may select the second beam directions based on a space departure of each of second set of beam directions with respect to the second active beam direction. For example, the second beam direction other than the second active beam direction may be chosen as one with the largest space departure of beam direction with respect to the current second active beam direction, which may lead to a lower interference due to the largest spatial departure with respect to the current interfering second active beam direction.

In another embodiment of the invention, in step 4220, the second transmitter may select the second beam direction based on a geometric position of the first receiver, and the geometric position of the first receiver may be conveyed in the beam direction selection signaling or in other separate signaling. For example, the second transmitter may maintain historical interference information, which is related to a second beam direction in the second communication link and geometric position of a first receiver in the first communication link, which sends the second transmitter a beam direction selection signaling or reporting it with an interference occurrence. For example, the second transmitter may selection the second beam direction, which has the most possibility to have no interference or have interference below a certain threshold. It should be appreciated that this historical interference information may be updated periodically or based on certain updating triggering events. The beam direction selection could be performed based on different metrics, such as difference distance metrics or through heuristic or machine learning algorithms.

In still another embodiment of the invention, in step 4230, the second transmitter may select the second beam direction based on a mapping between each of the second set of beam directions and an interference level. For example, the interference level may be defined as a count number of interference times in a certain time window, which statistically measures the interference severity with respect to each second beam direction. The second transmitter may select the second beam direction with the lowest interference level, for example. Alternatively or additionally, the second transmitter may select the second beam direction by jointly considering the signal strength, such as Reference Signal Receiving Power (RSRP), Reference Signal Receiving Quality (RSRQ), Received Signal Strength Indication (RSSI), Signal to Noise Ratio (SNR) in the second communication link and the interference level as descried above. It is desirable the initial beam direction may be selected based on such statistical or historical information.

In yet still another embodiment of the invention, the second transmitter may randomly select a second beam direction other than the second active beam direction from the second set of beam directions. It should be noted that the interference may not be actually solved after the second transmitter selecting a second beam direction, and in such situations, when a second beam direction in the second communication link is selected, the first receiver may try again to select another first beam direction to further mitigate the interference. Therefore, the beam direction selection may be performed in an iterative fashion between the first communication link and the second communication link, as a preferable but not limiting embodiment of the invention for example. The person skilled in the art may conceive or appreciate any modification or variation to the methods described above, without departing the spirit and scope of the disclosure.

In a further embodiment of the invention, the second transmitter may inform the second receiver with the selected second beam direction and it will transmit further data to the second receiver in the selected second beam direction in the second communication link. In a still further embodiment of the invention, the second transmitter may suspend transmitting data to the second receiver in the second communication link for a preset period, in response to receiving the beam direction selection signaling from the first receiver for a preset number of times. In a still further embodiment of the invention, the second transmitter may suspend transmitting data to the second receiver in the second communication link for a preset period, in response to receiving an explicit signaling, which indicates the second transmitter to suspend its transmission, i.e., not to perform a further beam direction selection. In such situations, the interference cannot be solved in certain times of attempts, which means the second transmitter should suspend its transmission in order to eliminate the interference to the first communication link, for example. The present number of times could be selected or updated by the network side adapted to different application scenarios.

Figure 5:
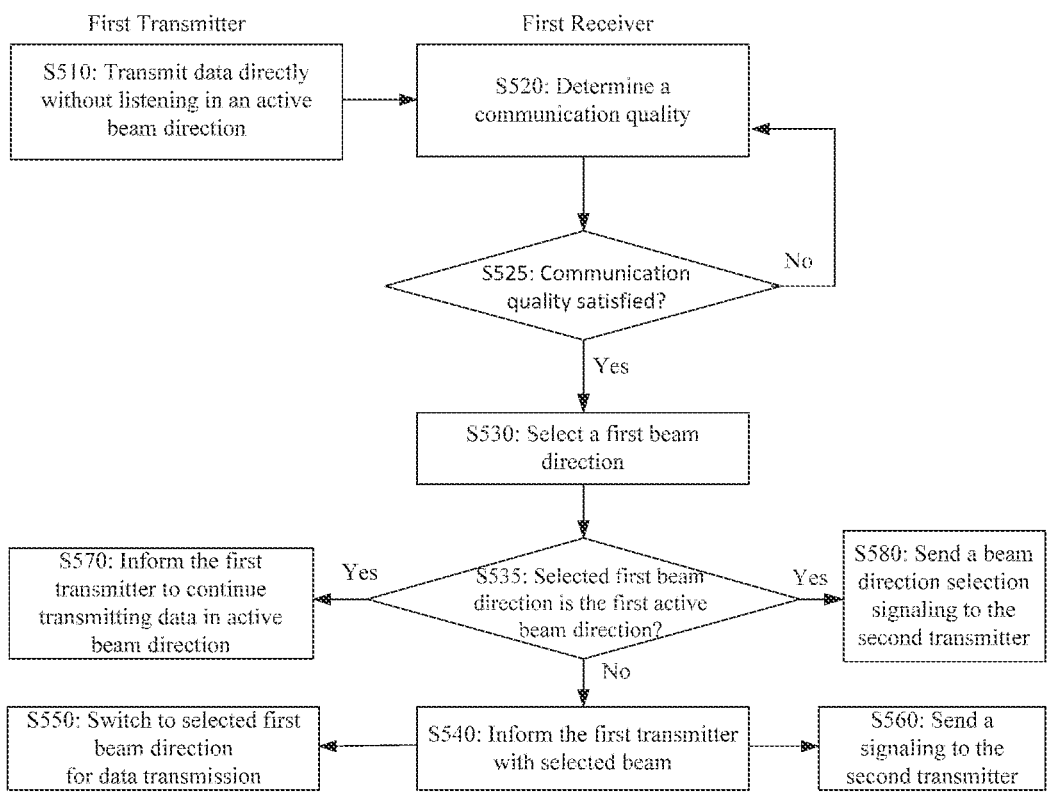
FIG. 5 illustrates an exemplary flow diagram for a process of a first transmitter and a first receiver in a first communication link in a wireless network according to one or more embodiments of the invention.

FIG. 5 illustrates an exemplary flow diagram for a process of a first transmitter and a first receiver in a first communication link in a wireless network according to one or more embodiments of the invention. In step 510, the first transmitter transmits data in a first active beam direction to the first receiver in the first communication link, without listening to the shared channel first. The transmission may be suffered from the presence of interference from the second communication link. In step 520, the first receiver determines the communication quality. As discussed above, the communication quality may be taken in any form of appropriate measures, which could be employed to describe the quality of the equivalent communication channel by taking the beamforming effect in the first communication link into consideration. In step 525, the first receiver determines whether the communication quality satisfies a predefined criterion or not. If the communication quality satisfies the predefined criterion, it means the quality of the equivalent channel is deteriorated by the interference from the second communication link to a certain extent. Therefore, the first receiver in step 530 may select a first beam direction in order to alleviate the interference by exploiting a spatial freedom.

In step 535, it will be determined whether there is a first beam direction other than current active beam direction selected for beam direction switching. If there is a first beam newly selected, the first receiver may inform the first transmitter with the newly selected first beam direction in step 540 and the first transmitter may switch to the newly selected first direction for further data transmission in step 550. In an optional step 560, the first receiver may send a signaling to the second transmitter, which indicates that the second transmitter is not required to suspend its transmission. If it is determined that the selected first beam direction selection is the first active beam direction in step 535, as a preferable embodiment, the first receiver may inform the first transmitter to continue transmission in the current first active beam direction in step 570, and it will also send the second transmitter a beam direction selection signaling in step 580 to instruct the second transmitter to perform a second beam direction selection in the second communication link, in order to further reduce the interference. For simplicity, the illustrated process is shown and described as a series of steps. However, the process may not be limited by the order of the steps because, in some embodiments, the steps may occur in different orders than shown and described. Moreover, fewer than all the illustrated steps may be required to implement an example embodiment of the invention. For example, the first transmitter may either perform a beam switching in the first communication link, or directly send a beam direction selection signaling to the second transmitter, causing the second transmitter to switch a second beam direction to lower the interference.

Figure 6:
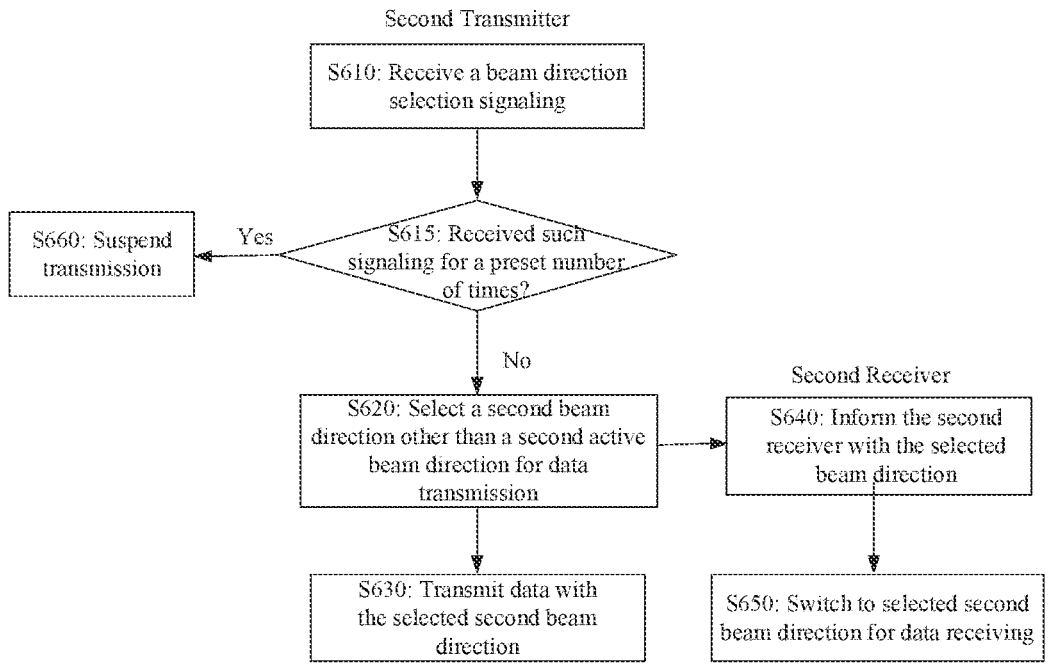
FIG. 6 illustrates an exemplary flow diagram for a process of a second transmitter and a second receiver in a second communication link in a wireless network according to one or more embodiments of the invention.

FIG. 6 illustrates an exemplary flow diagram for a process between a second transmitter and a second receiver in a second communication link in a wireless network according to one or more embodiments of the invention. In step 610, the second transmitter may receive a beam direction selection signaling from the first receiver in the first communication link. In step 615, the second transmitter may determine whether the beam direction selection signaling is received for a preset number of times. If the beam direction signaling has not been received for the preset number of times, it means that second communication link may select a second beam direction other than the second active beam direction in order to reduce the interference to the first communication link, which is shown in step 620. In such step 620, the second transmitter selects a second beam direction other than its active beam direction for data transmission so as to reduce the interference to the first receiver. Then, the second transmitter may transmit data on the newly selected second beam direction in step 630, and the second receiver may also inform the second receiver with the newly selected beam direction in step 640, which will cause the second receiver to switch to the newly selected beam direction for data receiving in step 650. If the beam direction selection signaling has been received for the preset number of times in step 615, which means the interference may not be solved via beam switching in the second communication link, and thus the second transmitter may suspend its transmission in step 660, thereby eliminating the interference to the first communication link.

For simplicity of explanation, the methodology described in conjunction with FIGS. 1-6 is depicted and described as a series of acts. It is to be understood and appreciated that aspects of the subject matter described herein are not limited by the acts illustrated and/or by the order of acts. In one embodiment, the acts occur in an order as described above. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 7:
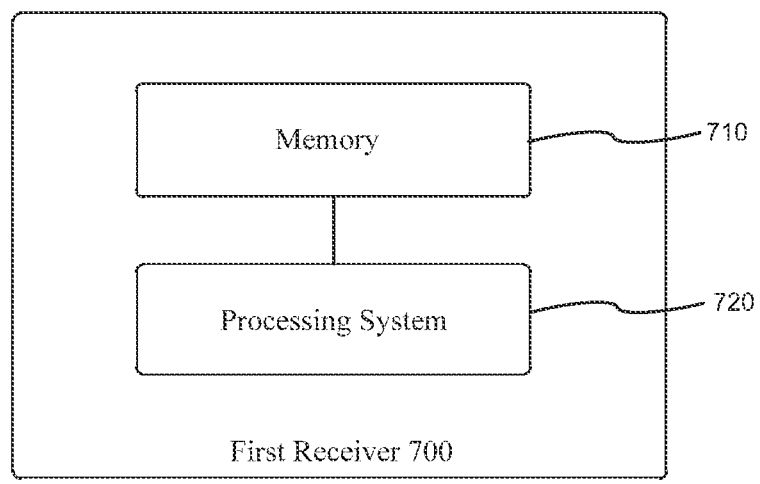
FIG. 7 schematically shows a block diagram of a first receiver according to one or more embodiments of the invention.

FIG. 7 schematically shows a block diagram of a first receiver according to one or more embodiments of the invention. The first receiver 700 may be an access node or a communication device, depending on the first transmission in the first communication link is an uplink transmission or a downlink transmission. It may for example correspond to the first receiver described in connection with any one of FIGS. 1, 3 and 5. The first receiver 700 comprises a memory 710 storing computer processor-executable instructions and a processing system 720 configured to execute the instructions performing the steps of the method illustrated in any one of FIGS. 1, 3 and 5. For example, the processing system 720 which includes one or more microprocessor or microcontrollers, as well as other digital hardware, which may include Digital Signal Processors (DSP), special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory 710 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 710 includes suitably configured program code to be executed by the processing system so as to implement the above-described functionalities of the first receiver. In particular, the memory may include various program code modules for causing the first receiver to perform processes as described above, e.g., corresponding to the method steps of any one of FIGS. 1, 3 and 5. The first receiver may also comprise at least one interface (not shown) for communicating with the wireless device or access node, e.g. a wireless interface, and/or for communicating with the neighboring communication device or access node, e.g. a wired or wireless interface. The interface could be coupled to the processing system. Information and data as described above in connection with the methods may be sent via the interface.

Figure 8:
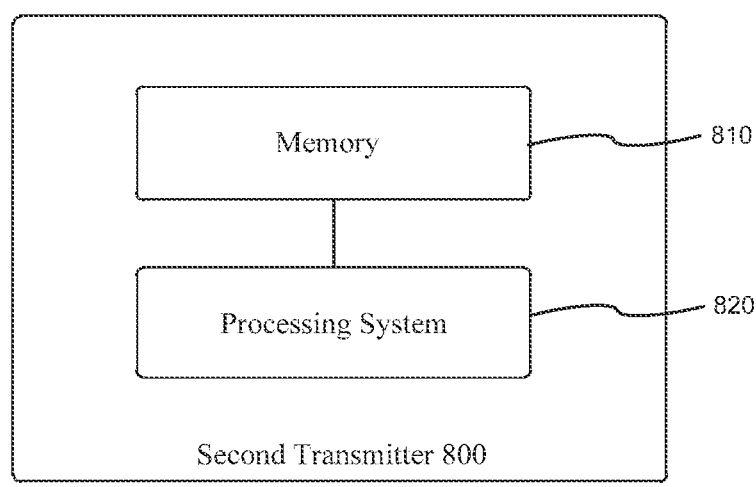
FIG. 8 schematically shows a block diagram of a second transmitter according to one or more embodiments of the present invention.

FIG. 8 schematically shows a block diagram of a second transmitter according to one or more embodiments of the present invention. The second transmitter 800 may be an access node or a communication device, depending on the second transmission in the second communication link is an uplink transmission or a downlink transmission. It may for example correspond to the second transmitter described in connection with any one of FIGS. 4 and 6. The second transmitter 800 comprises a memory 810 storing computer processor-executable instructions and a processing system 820 configured to execute the instructions performing the steps of the method illustrated in any one of FIGS. 4 and 6. For example, the processing system 820 which includes one or more microprocessor or microcontrollers, as well as other digital hardware, which may include DSP, special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory 810 may include a ROM, e.g., a flash ROM, a RAM, e.g., a DRAM or SRAM, a mass storage, e.g., a hard disk or solid state disk, or the like. The memory 810 includes suitably configured program code to be executed by the processing system so as to implement the above-described functionalities of the second transmitter. In particular, the memory may include various program code modules for causing the second transmitter to perform processes as described above, e.g., corresponding to the method steps of any one of FIGS. 4 and 6. The second transmitter may also comprise at least one interface (not shown) for communicating with the wireless device or access node, e.g. a wireless interface, and/or for communicating with the neighboring communication device or access node, e.g. a wired or wireless interface. The interface could be coupled to the processing system. Information and data as described above in connection with the methods may be sent via the interface.

The present disclosure may also be embodied in the computer program product which comprises all features capable of implementing the method as depicted herein and may implement the method when loaded to the computer system. A set of software modules may correspond to a set of respective steps or actions in any method described in conjunction with FIGS. 1, 3-6, and it is appreciated for the person skilled in the art that the aforementioned modules could be implemented via Programmable Logic Device (PLD), Field Programmable Gate Array (FPGA), Application Specific Integrated Circuit (ASIC), and other implement mechanisms as software products, application specific firmware, hardware products and a combination thereof.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

The present disclosure has been specifically illustrated and explained with reference to the preferred embodiments. The skilled in the art should understand various changes thereto in form and details may be made without departing from the spirit and scope of the present disclosure.

The invention claimed is:

1. A method for a first communication device receiving data from a first access node in a first communication link, the first communication link sharing a communication channel with a second communication link between a second access node and a second communication device in a wireless network, the first communication link corresponding to a first set of beam directions, the method performed by the first communication device comprising:
   receiving data from the first access node in a first active beam direction in the first communication link regardless of a presence of interference from the second communication link between the second access node and the second communication device, wherein the communication devices and the access nodes are different types of communication elements;
determining whether a communication quality of the first communication link satisfies a predefined criterion, in the presence of the interference from the second communication link between the second access node and the second communication device, wherein the first communication device determines whether the communication quality satisfies the predefined criterion no earlier than receiving the data from the first access node;
selecting a first beam direction from the first set of beam directions for subsequent communication on the first communication link in response to determining the communication quality satisfying the predefined criterion; and
in response to the first beam direction other than the first active beam direction having been selected:
    informing the first access node of the first communication link with the selected-first beam direction;
    sending a signaling to the second access node of the second communication link; or
in response to the selected first beam direction being the first active beam direction:
    sending a beam direction selection signaling to the second access node, wherein the second communication link corresponds to a second set of beam directions, and the beam direction selection signaling indicates the second access node to select a second beam direction other than a second active beam direction from the second set of beam directions in the second communication link.

2. The method according to claim 1, wherein:
the determining whether the communication quality satisfies the predefined criterion comprises:
    decoding the data received from the first access node in the first communication link; and
    determining whether the data is successfully decoded; and
the selecting the first beam direction from the first set of beam directions is performed in response to determining the data is not successfully decoded.

3. The method according to claim 1, wherein:
the determining whether the communication quality satisfies the predefined criterion comprises:
    measuring an interference from the second communication link in the first active beam direction; and
    determining whether the interference is higher than a predefined active-beam interference level; and
the selecting the first beam direction from the first set of beam directions is performed in response to determining the interference level being higher than the predefined active-beam interference level.

4. The method according to claim 1, wherein the selecting the first beam direction from the first set of beam directions comprises:
measuring an interference from the second communication link in each of the first set of beam directions; and
selecting the first beam direction with one interference measurement value being lower than an interference threshold.

5. The method according to claim 1 further comprising:
in response to the first beam direction other than the first active beam direction having been selected,
receiving data from the first access node in the selected first beam direction in the first communication link.

6. The method according to claim 1, wherein in response to the first beam direction other than the first active beam direction having been selected, the signaling sent from the first communication device to the second access node of the second communication link indicates that the second access node is not required to suspend transmitting to the second communication device in the second communication link.

7. The method according to claim 1 further comprising:
in response to the selected first beam direction being the first active beam direction, informing the first access node to continue transmitting data in the first active beam direction in the first communication link.

8. The method according to claim 1, wherein:
in response to the selected first beam direction being the first active beam direction, the beam direction selection signaling indicates the second access node to select the second beam direction other than the second active beam direction from the second set of beam directions in the second communication link.

9. A method for a second access node transmitting data to a second communication device in a second communication link, the second communication link sharing a communication channel with a first communication link between a first access node and a first communication device in a wireless network, the second communication link corresponding to a second set of beam directions, the method performed by the second access node comprising:
receiving a beam direction selection signaling from the first communication device, wherein:
    the beam direction selection signaling indicating the second access node to select a second beam direction from the second set of beam directions other than a second active beam direction; and
    the first communication device is different from the second communication device, and the first communication device and the second access node exist in different communication links; and
selecting the second beam direction other than the second active beam direction from the second set of beam directions in the second communication link in response to the beam direction selection signaling.

10. The method according to claim 9, wherein the selecting the second beam direction from the second set of beam directions is based on a space departure of each of the second set of beam directions with respect to the second active beam direction, wherein the space departure is represented by a beam direction vector.

11. The method according to claim 9, wherein the selecting the second beam direction from the second set of beam directions further comprises:
selecting the second beam direction based on a geometric position of the first communication device, wherein the geometric position of the first communication device is conveyed in the beam direction selection signaling.

12. The method according to claim 9, wherein the selecting the second beam direction from the second set of beam directions is based on a mapping between each of the second set of beam directions and an interference level.

13. The method according to claim 9, wherein the method further comprises:
informing the second communication device with the selected second beam direction; and
transmitting data to the second communication device in the selected second beam direction in the second communication link.

14. The method according to claim 9, wherein the method further comprises:

in response to receiving the beam direction selection signaling from the first communication device for a preset number of times, suspending transmitting data to the second communication device in the second communication link for a preset period.

15. A first communication device receiving data from a first access node in a first communication link, the first communication link sharing a communication channel with a second communication link between a second access node and a second communication device in a wireless network, the first communication device comprising:
   a memory storing processor-executable instructions; and
   a processing system comprising one or more processors configured to execute the processor-executable instructions to:
      receive data from the first access node in a first active beam direction in the first communication link regardless of a presence of interference from the second communication link between the second access node and the second communication device, wherein the communication devices and the access nodes are different types of communication elements;
      determine whether a communication quality of the first communication link satisfies a predefined criterion in the presence of the interference from the second communication link between the second access node and the second communication device, wherein whether the communication quality satisfies the predefined criterion is determined no earlier than the data is received from the first access node;
      select a first beam direction from the first set of beam directions for subsequent communication on the first communication link in response to determining the communication quality satisfying the predefined criterion; and
      in response to the first beam direction other than the first active beam direction having been selected:
         inform the first access node of the first communication link with the selected first beam direction;
         send a signaling to the second access node of the second communication link; or
      in response to the selected first beam direction being the first active beam direction:
         send a beam direction selection signaling to the second access node, wherein the second communication link corresponds to a second set of beam directions, and the beam direction selection signaling indicates the second access node to select a second beam direction other than a second active beam direction from the second set of beam directions in the second communication link.

16. The first communication device according to claim 15, wherein:
   to determine whether the communication quality satisfies the predefined criterion comprises:
      to decode the data received from the first access node in the first communication link; and
      to determine whether the data is successfully decoded; and
   to select the first beam direction from the first set of beam directions is performed in response to determining the data is not successfully decoded.

17. The first communication device according to claim 15, wherein:
   to determine whether the communication quality satisfies the predefined criterion comprises:
      to measure an interference from the second communication link in the first active beam direction; and
      to determine whether the interference is higher than a predefined active-beam interference level; and
   to select the first beam direction from the first set of beam directions is performed in response to determining the interference level being higher than the predefined active-beam interference level.

18. A second access node transmitting data to a second communication device in a second communication link, the second communication link sharing a communication channel with a first communication link between a first access node and a first communication device in a wireless network, the second communication link corresponding to a second set of beam directions, the second access node comprising:
   a memory storing processor-executable instructions; and
   a processing system comprising one or more processors configured to execute the processor-executable instructions to:
      receive a beam direction selection signaling from the first communication device, wherein:
         the beam direction selection signaling indicating the second access node to select a second beam direction from the second set of beam directions other than a second active beam direction; and
         the first communication device is different from the second communication device, and the first communication device and the second access node exist in different communication links; and
      select the second beam direction other than the second active beam direction from the second set of beam directions in response to the beam direction selection signaling.

19. The second access node according to claim 18, wherein to select the second beam direction from the second set of beam directions is based on a space departure of each of the second set of beam directions with respect to the second active beam direction, wherein the space departure is represented by a beam direction vector.

20. The second access node according to claim 18, wherein to select the second beam direction from the second set of beam directions is based on a geometric position of the first communication device, wherein the geometric position of the first communication device is conveyed in the beam direction selection signaling.

* * * * *